(12) United States Patent
Kitajima et al.

(10) Patent No.: US 6,435,171 B2
(45) Date of Patent: Aug. 20, 2002

(54) AIR-FUEL RATIO CONTROL APPARATUS

(75) Inventors: Shinichi Kitajima; Atsushi Matsubara; Asao Ukai; Hideyuki Takahashi, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 11 days.

(21) Appl. No.: 09/736,400

(22) Filed: Dec. 15, 2000

(30) Foreign Application Priority Data

Dec. 20, 1999  (JP) ............................................ 11-361921

(51) Int. Cl.$^7$ ............................................... F02B 75/08
(52) U.S. Cl. ...................................... 123/688; 73/23.32
(58) Field of Search ................................ 123/688, 690, 123/672, 703; 73/23.32, 23.31, 118.1; 60/276, 277, 274, 285

(56) References Cited

U.S. PATENT DOCUMENTS

| 5,212,947 A | * | 5/1993 | Fujimoto et al. | ............. | 60/276 |
| 5,235,957 A | * | 8/1993 | Furuya | ....................... | 123/688 |
| 5,485,382 A | * | 1/1996 | Seki et al. | .................. | 123/688 |
| 5,610,321 A | * | 3/1997 | Shinmoto | .................. | 73/23.32 |
| 5,970,967 A | * | 10/1999 | Uchikawa | .................. | 123/688 |

* cited by examiner

Primary Examiner—Willis R. Wolfe
Assistant Examiner—Mahmoud Gimie (57) ABSTRACT

The present invention increases the frequency of the LAF sensor deterioration determination in the case that air-fuel ratio control is being carried out while the deterioration of the LAF sensor is being monitored. When the monitor conditions are no longer satisfied during the deterioration determination of the LAF sensor (as shown in (a) and (b) of FIG. 6), the LAF prohibition timer is operated (as shown in (c) of FIG. 6), and switching to a lean burn is prohibited for a predetermined time interval (for example, 7 seconds), and in addition, after the LAF sensor deterioration determination has completed, after passage of a time interval shorter than this predetermined time interval (for example, 2 seconds) (as shown in figures (c) and (d) of FIG. 6), a lean burn is permitted. Thereby, in the case that monitor conditions are no longer satisfied during monitoring, because the lean burn is prohibited, unlike conventional technology, there is no immediate switch to a lean burn, and therefore, the frequency of the deterioration determination of the LAF sensor can be increased.

7 Claims, 6 Drawing Sheets

AIR-FUEL RATIO CONTROL APPARATUS

BACKGROUND OF THE INVENTION

1. Field of the Invention

The present invention relates to an air-fuel ratio control apparatus that controls the air-fuel ratio of an air-fuel mixture supplied to an internal combustion engine, and in particular relates to an air-fuel control apparatus that carries out the detection of malfunctions of an air-fuel ratio detection sensor that detects the air-fuel ratio in the exhaust of the internal combustion engine.

2. Background Art

Conventionally, as a method for detecting damage to an air-fuel ratio sensor (hereinbelow, referred to as the LAF sensor) that is provided in the exhaust system of the engine and outputs a signal roughly proportional to the oxygen concentration in the exhaust, the change in the output properties of the LAF sensor are monitored and damage or deterioration of the LAF sensor is detected based on the output of the air-fuel ratio (Japanese Unexamined Patent Application, First Publication, No. Hei 8-338290).

However, the sensor deterioration determination processing that determines the deterioration of the above-described LAF sensor must be carried out when the running conditions of the internal combustion engine satisfy predetermined conditions (hereinbelow, referred to as the monitor conditions). Therefore, even during the interval in which the sensor deterioration determination process is carried out, when the running conditions of the internal combustion engine do not satisfy the monitor conditions, the sensor deterioration determination processing must be temporarily suspended until the running conditions again satisfy the monitor conditions.

In particular, during the sensor deterioration determination processing, in the case that the air-fuel ratio must be controlled so as to be in proximity to a stoichiometric air-fuel ratio and the determination processing suspends and moves to a lean fuel mixture zone, the frequency of carrying out the deterioration determination processing of the sensor is reduced because of the time taken until the control of the stoichiometric air-fuel ratio is carried out again. Furthermore, output fluctuation during the switching between the lean fuel mixture and the stoichiometric air-fuel ratio occurs, and the drivability deteriorates.

The present invention solves the above-described problems, and has the object of providing an air-fuel ratio control apparatus that carries out efficient deterioration detection processing of the air-fuel ratio sensor.

Specifically, in the interval during which the deterioration determination processing of the above air-fuel ratio sensor is carried out, in the case that the running conditions of the internal combustion engine no longer satisfy the conditions allowing the carrying out of this deterioration detecting processing, switching to the lean fuel mixture is prohibited.

SUMMARY OF THE INVENTION

In order to attain the above object, the air-fuel ratio control apparatus according to the present invention is characterized in providing an air-fuel ratio detection device that is (the LAF sensor 17) provided in the exhaust system (the exhaust duct 16, the three way catalysts 19, 20, etc.) of an internal combustion engine, and outputs a signal approximately proportional to the concentration of oxygen in the exhaust, a lean fuel mixture zone determination device (in the embodiment, provided in the ECU 5) that determines whether or not the internal combustion engine is in the lean fuel mixture zone based on the running state of the internal combustion engine, a lean fuel mixture control device (in the embodiment, provided in the ECU 5) that controls the air-fuel ratio of the air-fuel mixture supplied to the internal combustion engine so as to be a leaner air-fuel ratio than the stoichiometric air-fuel ratio when the internal combustion engine is determined to be in the lean fuel mixture zone by the lean fuel mixture zone determination device, a check zone determination device (in the embodiment, step S572 to step S584) that determines whether or not the internal combustion engine is the check zone, a malfunction check device (in the embodiment, step S521 to step S541) that checks for a malfunction of the air-fuel ratio detection device based on the output of the air-fuel ratio detection device, and a malfunction check termination device (in the embodiment, step S11 to step S17) that, during an malfunction check by the malfunction check device, terminates the malfunction check when the check zone determination device determines that the internal combustion engine is not in the check zone and at the same time prohibits this lean fuel mixture control for a predetermined time interval.

DETAILED DESCRIPTION OF THE INVENTION

Below, a preferred embodiment of the present invention will be explained referring to the figures.

Figure 1:
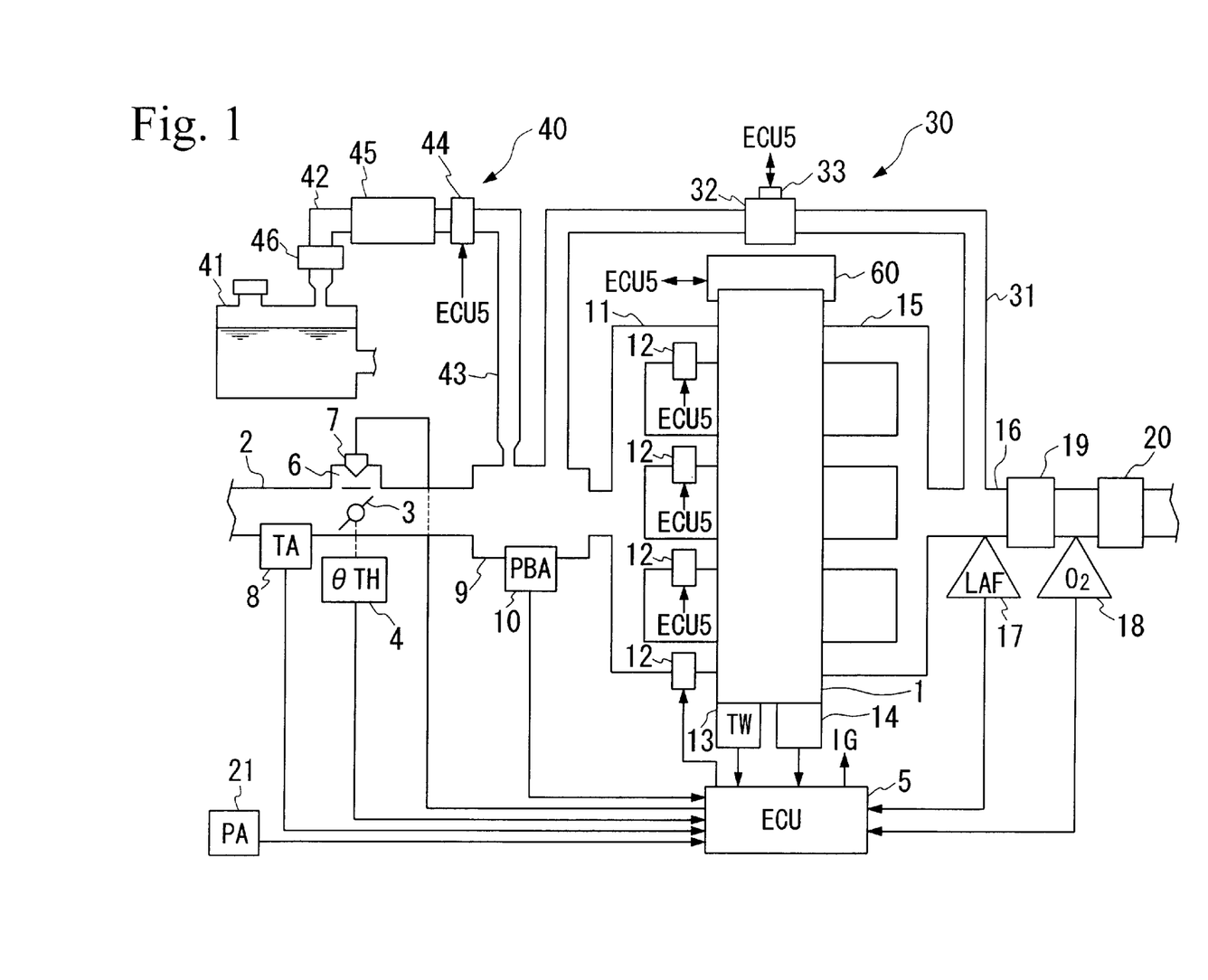
FIG. 1 is a structural drawing of the engine and the control apparatus including the air-fuel ratio control apparatus according to the embodiment of the present invention.

FIG. 1 is a drawing showing the structure of the engine and control apparatus that includes the air-fuel ratio control apparatus according to the embodiment of the present invention.

In this figure, reference numeral 1 is a DOHC straight 4 cylinder engine providing an intake air valve and exhaust valve (not illustrated) for each cylinder. The intake air duct 2 of the engine 1 communicates with the combustion chamber of each cylinder of the engine 1 via a branching part 11 (the intake air manifold). Along the intake air duct 2, a throttle valve 3 is disposed. A throttle valve opening degree (ΘTH) sensor 4 communicates with the throttle valve 3, and outputs an electronic signal, which depends on the throttle valve opening degree ΘTH, to be supplied to an electronic control unit 5 (hereinbelow, referred to as an ECU).

An assist air path 6 that bypasses the throttle valve 3 is provided on the intake air duct 2, and along this path 6, an assist air amount control valve 7 is provided. The assist air amount control valve 7 is connected to the ECU 5, and controls the amount that the valve is opened using this ECU 5.

An intake air temperature (TA) sensor 8 is installed upstream from the throttle valve 3 of the intake air duct 2, and the detection signal thereof is supplied to the ECU 5.

Between the throttle valve 3 of the intake duct 2 and the intake manifold 11, a chamber 9 is provided, and in the chamber 9 an intake air duct absolute pressure (PBA) sensor 10 is installed. The detection signal of the PBA sensor 10 is supplied to the ECU 5.

In the body of the engine 1, an engine water temperature (TW) sensor 13 is mounted, and the detection signal thereof is supplied to the ECU 5. A crankshaft angle position sensor 14 that detects the rotation angle of the crankshaft axis (not illustrated) of the engine 1 is connected to the ECU 5, and a signal that depends on the angle of rotation of the crankshaft axis is supplied to the ECU 5.

The crankshaft angle position sensor 14 comprises an air duct discrimination sensor that outputs a signal pulse (hereinbelow, referred to as the CYL signal) at a predetermined crankshaft angle position of a particular air duct of the engine 1, a TDC sensor that relates to the top dead center (TDC) at the beginning of the intake stroke of each cylinder and that outputs a TDC signal pulse at a crankshaft angle position (in a 4 cylinder engine, every crankshaft angle of 180 degrees) before a predetermined crankshaft angle, and a CRK sensor that generates one pulse (hereinbelow, referred to as a CRK signal pulse) at a constant crankshaft angle cycle (for example, a cycle of 30 degrees) that is shorter than the TDC signal pulse, and supplies the CYL signal pulse, the TDC signal pulse, and the CRK signal pulse to the ECU 5. These signal pulses are used for the timing control of the fuel injection time, the ignition time, etc., and the detection of the engine rotation speed NE.

A fuel injection valve 12 is provided on each cylinder slightly upstream from the intake valve of the intake manifold 11, and each injection valve is connected to a fuel pump (not illustrated) and an ECU 5, and the fuel injection time and the fuel ignition time (valve opening time) are controlled by the signal from the ECU 5. The ignition plug (not illustrated) of the engine 1 also connects to the ECU 5, and the ignition time ΘIG is controlled by the ECU 5.

The exhaust duct 16 is connected to the combustion chambers of the engine 1 via a branched part 15 (exhaust manifold). A wide-range air-fuel ratio sensor (hereinbelow, referred to as the LAF sensor) 17 is provided immediately downstream from where the branching part 15 meets on the exhaust duct 16. Furthermore, a three way catalyst 19 directly under the engine and a three way catalyst 20 under the carriage are provided downstream from the LAF sensor, and in addition, an oxygen concentration sensor (hereinbelow, referred to as the O2 sensor) is mounted between these three way catalysts 19 and 20. The three way catalysts 19 and 20 carry out cleaning of the HC, CO, $NO_x$, etc, in the exhaust gas.

The LAF sensor 17 is connected to the ECU 5, outputs an electronic signal roughly proportional to the oxygen concentration (the air fuel ratio) in the exhaust gas, and supplies this electronic signal to the ECU 5. The O2 sensor 18 has the property of rapidly changing when the output crosses the stoichiometric air-fuel ratio, and this output rises to a high level when the air-fuel ration becomes richer than the stoichiometric air-fuel ratio and falls to a low level when it becomes leaner. The O2 sensor 18 is connected to the ECU 5, and supplies this output to the ECU 5.

The exhaust circulation mechanism 30 is provided along the exhaust circulation path 31 connected the chamber 9 of the intake duct 2 to the exhaust duct 16, and the exhaust circulation path 31, and comprises a lift sensor 33 that detects the valve opening degree of the exhaust circulation valve 32 (the EGR valve) that controls the amount of exhaust circulation and the EGR valve 32. The throttle valve 32 is an electromagnetic valve having a solenoid connected to the ECU 5, and the valve opening degree of this valve can be linearly changed by the control signal from the ECU 5.

In the vapor fuel processing apparatus 40, the fuel tank 41 connects to the canister 45 via the conduit 42, and the canister 45 connects to the chamber 9 of the intake duct 2 via the purge path 43. The canister 45 has an absorbent that absorbs the vapor fuel generated in the fuel tank 41, and has an external air intake valve. Along the conduit 42, a two way valve 46 comprising positive and negative pressure valves is disposed, and along the purge path 43, a purge control 44, which is a duty control type electromagnetic valve, is provided. The purge control valve 44 is connected to the ECU 5, and is controlled according to a signal from the ECU 5.

The ECU 5 comprises an input circuit that corrects the voltage level by shaping the input signal wave from each sensor to a predetermined voltage and has functions such as changing an analog signal value to a digital signal value, a central processing unit (CPU), a memory circuit comprising ROM and RAM that stores each of the calculation programs executed by this CPU and the various maps and calculation results described below, and an output circuit that outputs a drive signal to each of the electromagnetic valves and ignition plugs of the fuel injection valve 12, etc.

The ECU 5 determines the various engine running states, such as the feedback control running zone and the open control running zone, depending on the output of the LAF sensor 17 and the O2 sensor 18 based on the various engine running parameter signals described below, and at the same time calculates the fuel injection time TOUT of the fuel injection valve 12 depending on the engine running state, and outputs a signal that drives the fuel injection valve 12 based on the result of this calculation.

To calculate the fuel injection time TOUT, a PID compensation coefficient KLAF, calculated by the PID control depending on the output of the LAF sensor 17, is used.

$$TOUT = K1 \times KLAF \times KCMD \times Ti + K2$$

Here, basically, Ti denotes the basic fuel amount set according to the engine rotation speed NE and the intake duct internal absolute pressure PBA. K1 denotes the compensation coefficient found depending on the running state, and K2 denotes the compensation amount found depending on the running state.

Figure 2:
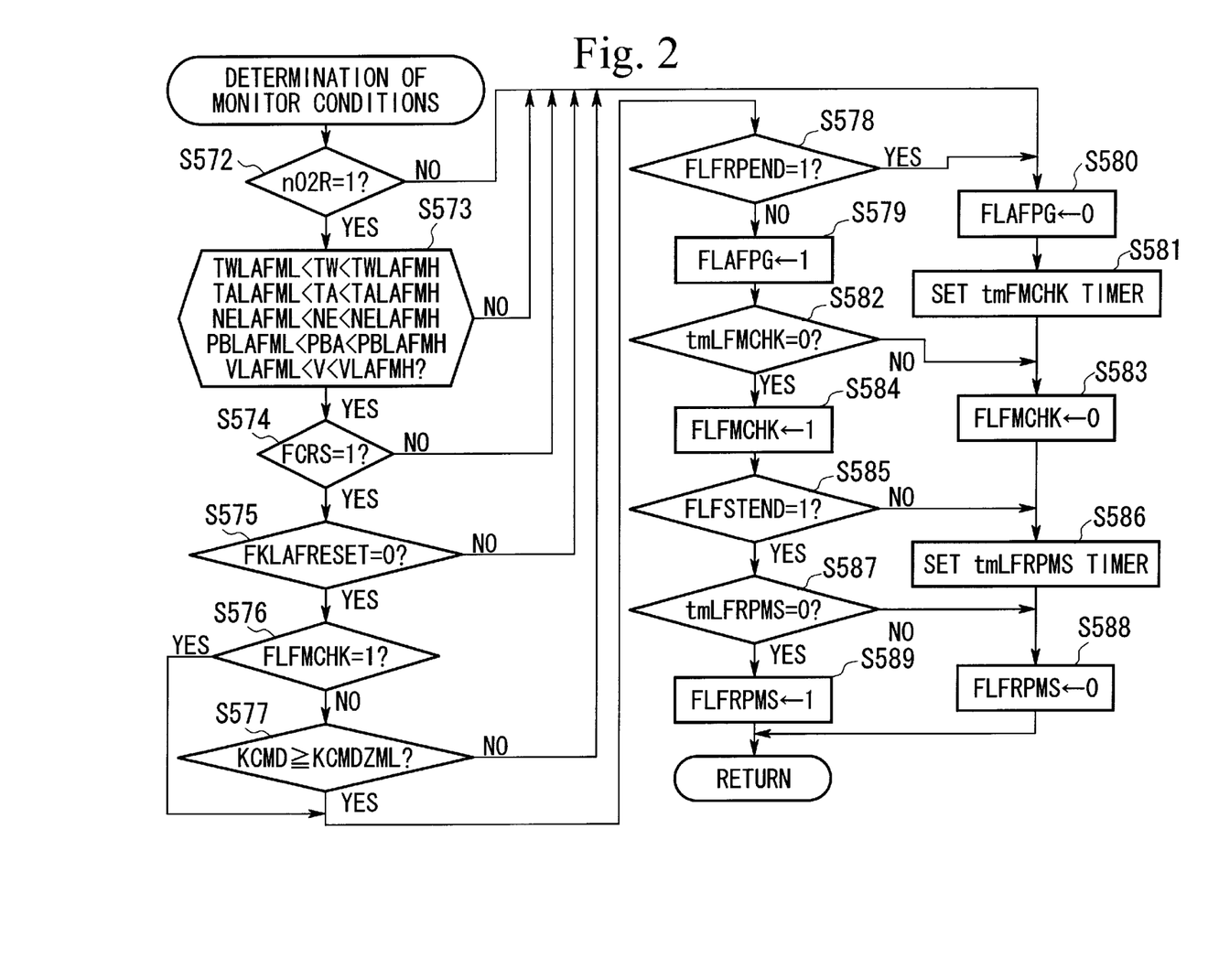
FIG. 2 is a flowchart showing the processing in which the monitor conditions are determined.

Next, in the apparatus structured as described above, the check zone determination processing that determines the running state that can carry out the deterioration determination processing of the LAF sensor 17, that is, whether or not the monitor conditions are satisfied, is explained referring to FIG. 2. Moreover, during this processing, execution by the ECU 5 or executed in the background, that is, not being executed as high priority processing.

First, step S572 in FIG. 2 determines whether or not the active flag nO2R is 1, which indicates that the O2 sensor 18 is in the active state, and when nO2R=1, determines whether or not the running state of the vehicle having the engine 1 installed is in a predetermined zone, that is, whether or not the monitor conditions of the LAF sensor are satisfied (step S573).

Specifically, it is determined whether or not the engine water temperature TW is within the range of the predetermined high and low values of TWLAFMH and TWLAFML, whether or not the intake temperature is within the range of the predetermined high and low values of TALAFMH and TALAFML, whether or not the engine rotation speed NE is within the range of the predetermined high and low values of NELAFMH and NELAFML, whether or not the intake duct internal absolute pressure PBA is within the range of the predetermined high and low values of PBLAFMH and PBLAFML, and whether or not the vehicle speed is within the range of the predetermined high and low values of VLAFMH and VLAFML, and when all of the answers are YES, it is determined that the running state is in the predetermined zone, that is, that the predetermined monitor conditions are satisfied.

In addition, in step S573, in the case that it is determined that all of the monitor conditions are satisfied, the processing proceeds to step S574, and determines whether or not the flag FCRS is 1, which indicates that the rate of change in the velocity of the vehicle is in a small cruise state, and when FCRS=1, it is determined whether or not the reset flag FKLAFRERET is 0.

As a result of the above determinations, in the case that the answer to all of steps S572 to S575 is NO, it is determined that the monitor conditions are not satisfied, the processing proceeds to step S 580, the flag FLAFPG is set to 0, and subsequently the decrement timer tmLFMCHK is set to a predetermined time TLFMCHK and started (step S581), the monitor condition flag FLFMCHK is set to 0 (step S583) are started, the decrement timer tmLFRPMS is set to a predetermined time TLFRPMS (step S586), the response deterioration determination start flag FLFRPMS is set to 0, (step S588), and this processing ends.

In contrast, in the case that all of the conditions in steps S572 to S575 are satisfied, the monitor conditions are determined to be satisfied, the processing proceeds to step S576, it is determined whether or not the monitor condition flag FLFMCHK is 1, and when FLFMCHK=1, step S577 is skipped, and the processing proceeds to step S578, whereas in the case that the monitor condition flag FLFMCHK is 0, the processing proceeds to step S577, where it is determined whether or not the target air-fuel ratio KCMD is equal to or greater than a predetermined value KCMDZML (for example, setting the value corresponding to the stoichiometric air fuel ratio, that is, to 1.0).

In step S577, in the case that it is determined that KCMD<KCMDZML, the monitor conditions are determined to be unsatisfied, the processing returns to the above step S580, and subsequently, after passing through step S581 to step S588, this processing ends.

In contrast, in step S577, if it is determined that KCMD≧KCMDZML, then the processing proceeds to step S578.

In step S578, it is determined whether or not the LAF sensor response deterioration determination end flag FLFRPEN is 1, and in the case that FLFRPEND=1, that is, in the case that the LAF sensor response deterioration determination has ended, the processing proceeds to step S580, and then after passing through steps S581 to S588, this processing ends.

In contrast, in step S578, in the case that the LAF sensor response deterioration determination end flag FLFRPEND= 0, the processing proceeds to step S579, the purge cut flag FLAFPG is set to 1 and the purge is cut, that is, the purge control valve of the vapor fuel processing apparatus 40 in FIG. 1 is closed, and thereby the purge is set to 0, and there is no influence by the purge gas during the check.

Next, in step S582, it is determine whether or not the value of the timer tm LFMCHK started in step S581 is 1. In the case that it is determined that tmLFMCHK>0, the processing proceeds to step S583, and after passing through step S586 and step S588, the processing ends.

In contrast, in step S582, in the case that it is determined that tmLFMCHK=0, the processing proceeds to step S584, it is determined that the monitor conditions are satisfied, the monitor condition flag FLFMCHK is set to 1, and then in step S585, it is determined whether or not the LAF sensor deterioration identification end flag FLFSTEND is 1.

As a result, in the case that the LAF sensor deterioration flag FLFSTEND=0, that is, that LAF sensor deterioration determination has not ended, the processing proceeds to step S586, and next, after passing through step S588, this processing ends.

In contrast, in step S585, in the case that FLFSTEND=1, that is, in the case that LAF sensor deterioration determination has ended, the processing proceeds to step S587, and it is determined whether or not the value of the timer tmLFRPMS that started in step S586 is 0.

In step S587, in the case that the timer tmLFMRPMS, the processing passes through step S588, and then ends.

In contrast, in the case that timer tmLFMRPMS>0, in step S589, the LAF sensor response deterioration determination start flag FLFRPMS is set to 1, and after allowing the start of the response deterioration determination, this processing ends.

Next, the deterioration determination processing of the LAF sensor 17 will be explained referring to FIG. 3 and FIG. 4.

Figure 3:
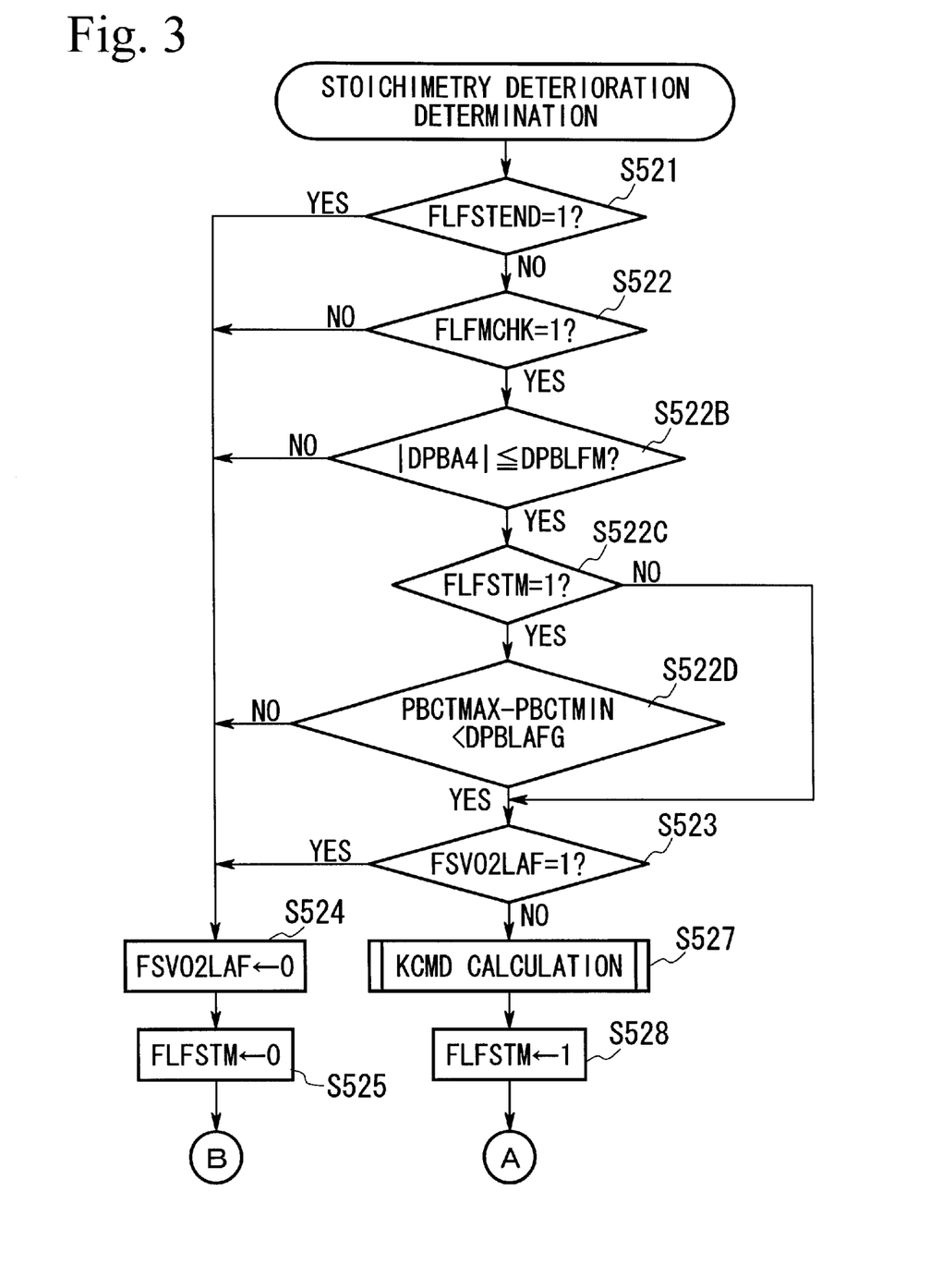
FIG. 3 is a flowchart showing the LAF sensor deterioration processing.

First, in step S521 in FIG. 3, it is determined whether or not the sensor deterioration determination end flag FLFS-TEND is 1, which indicates that the LAF sensor deterioration determination has ended, and in the case that the FLFSTEND=0, that is, when the sensor deterioration determination has not yet ended, it is determined whether or not the monitor condition flag FLFMCHK is 1, which indicates that the monitor conditions are satisfied (step S522). Here, the monitor condition flag FLMCHK is the flag that is set in the check zone determination processing shown in FIG. 2.

In step S522, in the case that the monitor condition flag FLMCHK is set to 1, it is determined whether or not the amount of fluctuation DPBA4 of the intake duct negative pressure is equal to or greater than the predetermined fluctuation amount DPBLFM (step S522B). In the case that the fluctuation amount DPBA4 of the intake duct negative pressure is equal to or less that a predetermined fluctuation amount DPBLFM, it is determined whether or not the LAF sensor deterioration determination execution flag FLFSTM is 1 (step S522C). In the case that the LAF sensor deterioration execution flag FLFSTM=1, it is determined whether or not the difference between the intake duct maximum negative pressure PBCTMAX and the minimum negative pressure PBCTMIN, that is, that is the maximum value of the intake negative pressure, is equal to or less than a predetermined fluctuation amount DPBLAFG (step S522D).

In step S522D, in the case that the maximum of the intake duct negative pressure is less than a predetermined fluctuation amount DPBLAFG, it is determined whether or not the O2 sensor output (SVO2) monitor flag FSVO2LAF is 1. In the case that the O2 sensor output (SVO2) monitor flag FSVO2LAF has not been set to 1, the processing proceeds to step S527.

In contrast, when the response in step S521 or step S523 is YES, and the response of all of steps S522, S522B, S522D is NO, executing the LAF sensor deterioration determination is not appropriate, and the SVO2 monitor flag FSVO2LAF is set to 0 (step S524), the LAF sensor deterioration determination execution flag FLFSTM is set to 0 (step S525), and at the same time, the decrement timer tmLFSTM is set to a predetermined time TLFSTM (step S526 in FIG. 4), and this processing ends.

Figure 4:
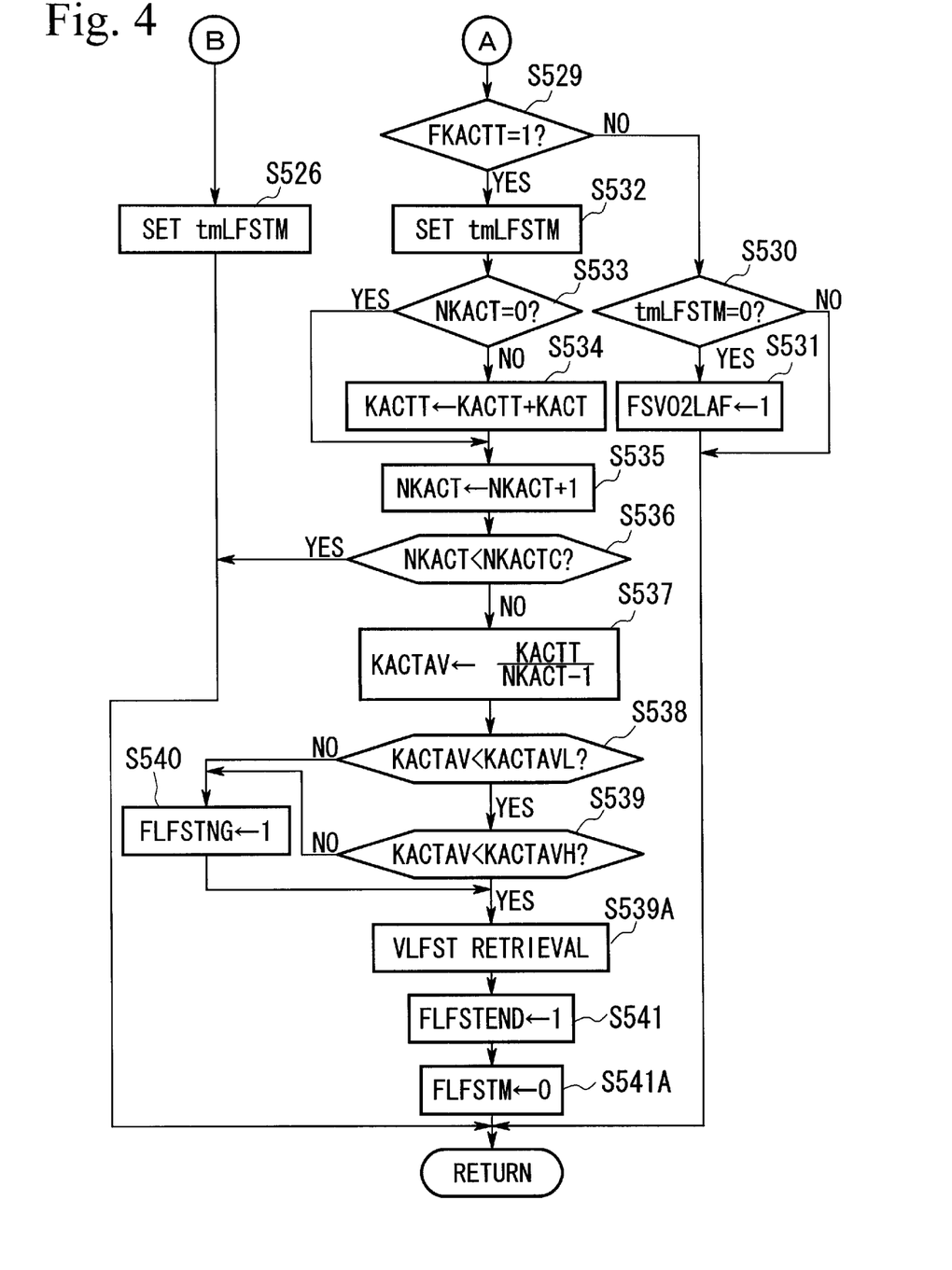
FIG. 4 is a flowchart showing the continuation of the LAF sensor deterioration processing.

Then, in step S527, calculation of the target air-fuel ratio KCMD, which serves as the target of the feedback, is carried out, specifically, the target air-fuel ratio KCMD is calculated based on the output of the O2 sensor 18, and then in step S528, the LAF sensor deterioration determination execution flag FLFSTM is set to 1, and the processing proceeds to step S529 (refer to step S528 in FIG. 4).

Next, in step S529, after the output of O2 sensor 18 inverts from the rich to the lean fuel mixture or from the lean to the rich fuel mixture, it is determined whether or not the inversion flag FKACTT is 1, which indicates that a predetermined amount of time has passed, and when FKACTT=0, that is, when the output of the O2 sensor 18 is not inverted, in the above step S526 or step S532 described below, it is determined whether or not the value of the timer tmLFSTM is 0 (step S530). As a result, when tmLFSTM>0, and the predetermined time TLFSTM has not passed, the processing immediately ends, and when tmLFSTM=0, the SVO2 monitor flag FSVO2LAF is set to 1 (step S 531), and this processing ends.

In contrast, in step S529, when FKACTT=1 and the O2 sensor output inverts from a rich to a lean fuel mixture or from a lean to a rich fuel mixture, the decrement timer tmLFSTM is set to a predetermined time TLFSTM and started (step S532), and it is determined whether or not the value of the counter NKACT is 0 (step S533). First, NKACT=0 and the processing proceeds to step S535, this counter NKACT is incremented by 1 (step S535), and it is determined whether not this value is smaller than a predetermined value NKACTC (for example, 5) (step S536). In step S536, in the case that NKACT<NKACTC, this processing immediately ends.

Next, when the O2 sensor output inverts, in step S533, because the value of the counter NKACT becomes 1, the processing proceeds to step S534, the integrated value KACTT of the detected equivalence ratio KACT is calculated based on the output of the LAF sensor 17 by the following formula 1, and the processing proceeds to step S535.

$$KACTT = KACTT + KACT \quad (1)$$

In addition, after passing through the above-described step S535, in step S536, when the inverted count reaches a predetermined value, that is, in step S536, when NKACT=NKACTC, the processing proceeds to step S537, and the average detected equivalence ratio KACTAV is calculated by the following formula 2:

$$KACTAV = KACTT/(NKACT-1) \quad (2)$$

Thereby, the KACTAV value is calculated as the average value of the KACT value while a plurality of locations are inverted during monitoring.

After beginning detection in this manner, the average value of KACT during inversion, excluding the initial inversion, is calculated, and thus the precision of the detection is increased. Moreover, during the initial inversion there is the concern that the control is not stabilized, there is concern that a large error will occur when using this point in the calculation of the average value. Thus, this point is not used.

Next, in steps S538 and S539, it is determined whether the average value KACTAV is larger than the predetermined lower limit value of KACTAVL, or whether or not it is higher than the upper limit value KACTAVH. As a result, when KACTAVL<KACTAV<KACTAVH, it is determined that the LAF sensor 17 has not deteriorated, and the flag FLFSTNG is set to 0.

Next, in step S539A, referring to the VLFST table, the amount of deviation VLFST with respect to the average value KACTAV is calculated. Based on this calculated amount of deviation, the output of the LAF sensor 17 can be compensated using a table and the like.

Subsequently, the processing progressed to step S541, and the LAF sensor deterioration determination end flag FLFSTEND is set to 1, in step S541 A, the LAF sensor deterioration execution end flag FLFSTM is set to 0, and this processing ends.

In addition, in step S538 and step S539, when KACTAV≦KACTAVL or KACTAV≧KACTAVH, it is determined that the LAF sensor 17 is deteriorating, the flag FLFSTNG is set to 1 (step S540), and processing proceeds to the above step S539A. In the above-described manner, determination of deterioration of the LAF sensor 17 and determination of the output deviation is carried out.

Figure 5:
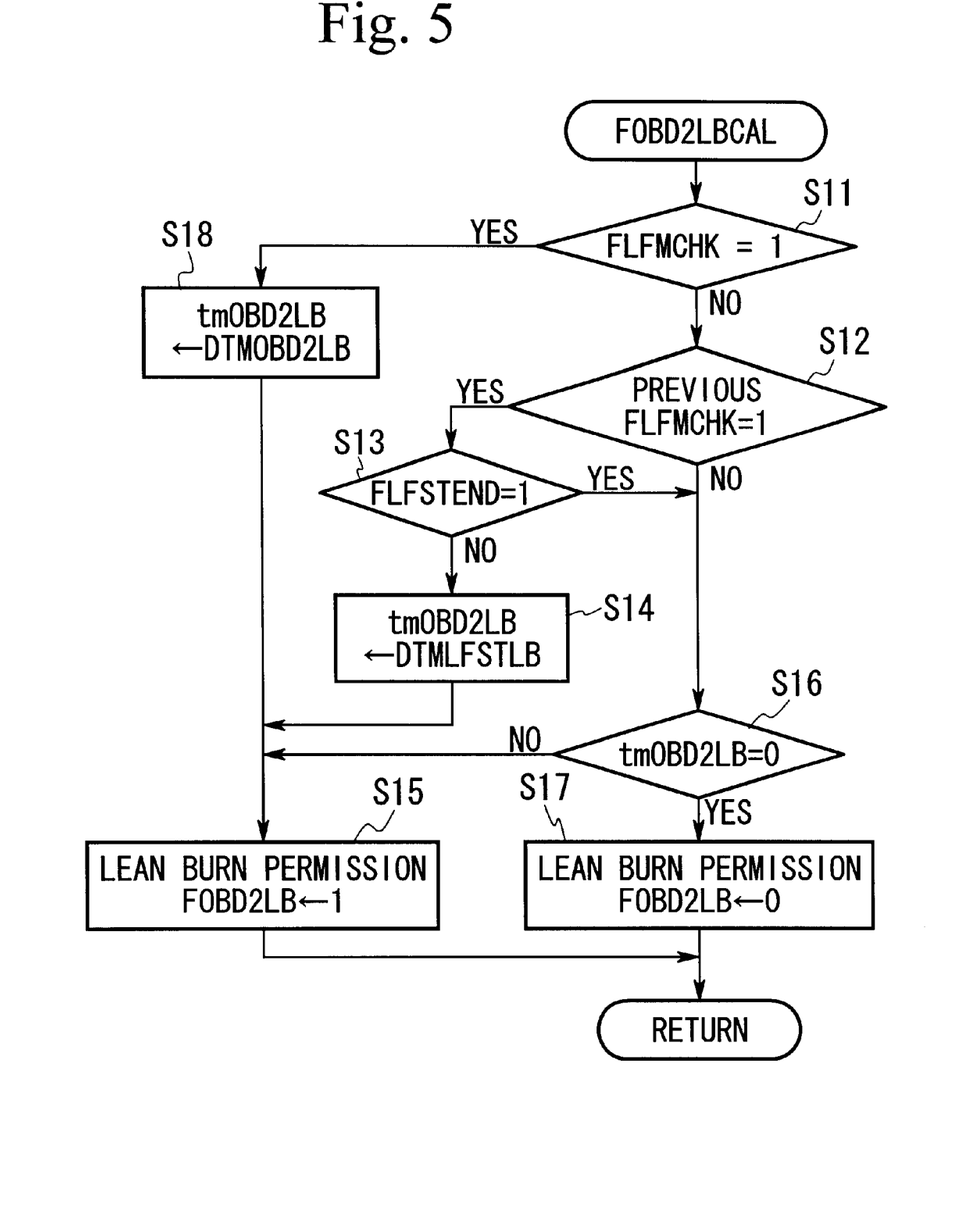
FIG. 5 is a flowchart showing the lean burn prohibition processing.

Next, FIG. 5 is a flowchart showing the lean burn probation processing that the air-fuel ratio control apparatus carries out while determining the deterioration of the LAF sensor 17.

In this figure, first, in step S11, it is determined whether or not the monitor condition flag FLFMCHK is 1. In the case that the monitor condition flag FLFMCHK is 0, that is, in the case that the running conditions of the engine do not satisfy the monitor conditions, the processing proceeds to step S12, where it is determined whether or not the monitor condition flag FLFMCHK is 1 before the monitor conditions were no longer satisfied.

In step S12, if the previous monitor condition flag is 1, the processing proceeds to step S13, where it is determined whether or not the LAF sensor deterioration determination end flag FLFSTEND, which was set to 1 during the LAF sensor deterioration determination end, is 1. In the case that the LAF sensor deterioration determination end flag FLFSTEND is 0, that is, in the case that the it has been determined that the LAF sensor has ended without having completed, the processing proceeds to step S14, and after the timer tmOBD2LB is set to a predetermined time DTMLFSTLB (for example, 7 seconds), in step S15, the lean burn prohibition flag FOBD2LB is set to 1, and lean burn is prohibited.

In contrast, in step S11, in the case that the monitor condition flag FLFMCHK is 1, the processing proceeds to step S18, and after the timer tmOBS2LB is set to DTMOBD2LB, which is a setting value shorter than DTMLFSTLB (for example, 2 seconds), in step S15, the lean burn prohibition flag FOBD2LB is set to 1, and a lean burn is prohibited.

In contrast, in step S12, in the case that the previous monitor condition flag FLFMCHK is not 1, or in step S13, in the case that the LAF sensor deterioration determination end flag FLFSTEND is 1, the processing proceeds to step S16, where it is determined whether or not the timer tmOBD2LB is 0, that is, whether or not the time of a timer set to 2 seconds or 7 seconds has completed. In the case that the time has completed, the processing proceeds to step S17, the lean burn prohibition flag FOBD2LB is set to 0, and at the same time the lean burn prohibition is terminated, and this processing ends.

In contrast, in step S16, if the timer tmOBD2LB is not 0, the processing proceeds to step S15, and the lean burn prohibition continues.

Next, the control of the lean burn prohibition during the deterioration determination processing of the LAF sensor 17 is explained referring to FIG. 6.

Figure 6A:
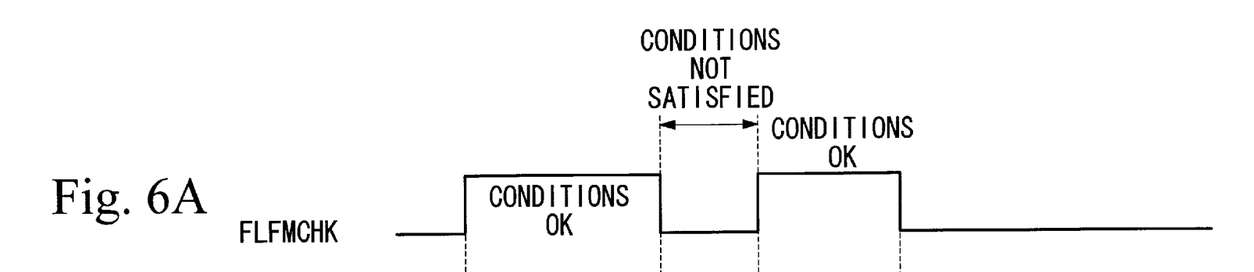
FIG. 6A to 6D are timing charts showing the lean burn prohibition processing.
Figure 6B:
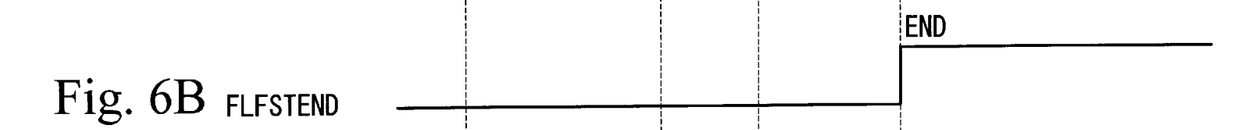

In this figure, the timing chart (a) shows the monitor condition flag FLFMCHK set to 1 in the case that the deterioration determination processing for the LAF sensor 17 can be executed. In addition, the timing chart (b) shows the LAF sensor deterioration determination end flag FLFS-TEND that is set to 1 during the deterioration determination processing end of the LAF sensor 17.

Figure 6C:
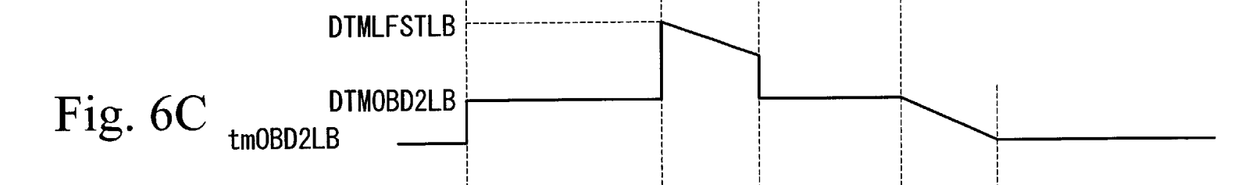
Figure 6D:
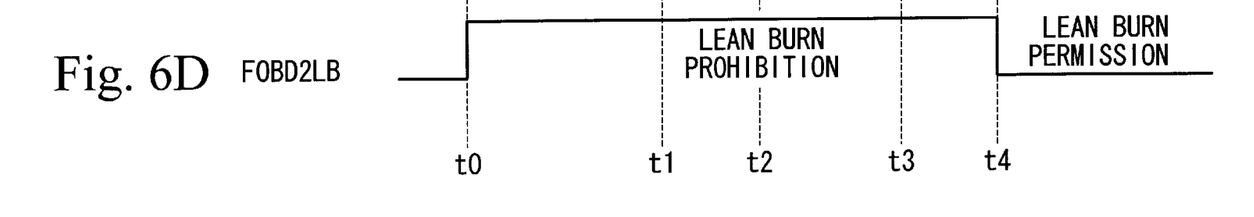

In addition, the timing chart (c) shows the count value of the decrement timer tmOBD2LB set to an arbitrary value (in this embodiment 2 seconds and 7 seconds) depending on the processing state. In addition, timing chart (d) shows the lean burn prohibition flag FOBD2LB set to 1 when the lean burn is prohibited.

In the figure, at time t0, the monitor conditions of the LAF sensor are satisfied, and the output monitoring of the LAF sensor 17 is executed. At the same time, the timer tmOBD2LB is set to DTMOBD2LB (for example 2 seconds), and in addition the lean burn prohibition flag FOBD2LB is set to 1, and a lean burn is prohibited.

Next, at time t1, when the running state of the engine changes and the monitor conditions are no longer satisfied, the value of the timer tmOBD2LB is set to DTMLFSTLB (for example, 7 seconds). Then, the lean burn prohibition continues.

Next, at time t2, while the time of the timer tmOBD2LB has not completed, the running state of the engine satisfies the monitor conditions, and even if the output monitor of the LAF sensor 17 is carried out again, until the time of the timer tmOBD2LB has completed, the lean burn prohibition flag FOBD2LB continues to be set as-is, and the lean burn probation control continues to be carried out.

In addition, at time 3, when the deterioration determination processing of the LAF sensor 17 completes, and the LAF sensor deterioration determination end flag FLFS-TEND is set to 0, at the same time the monitor condition flag FLFMCHK is set to 0, and in addition, in timer tmOBD2LB is set to DTMOBD2LB, which is a value smaller than the value DTMLFSTLB set in the case that the running state of the engine during the deterioration determination of the LAF sensor 17 no longer satisfies the monitor conditions. In addition, until the time of the timer tmOBD2LB is completed, the lean burn prohibition flag is set to 1, and when the time of the timer tmBD2LB is completed, it is set to 0, and the lean burn is permitted.

In this manner, when the predetermined monitor conditions are not satisfied during the deterioration determination of the sensor, control is carried out such that timer tmOBD2LB is activated, and for a predetermined time (for example, 7 seconds) switching to a lean burn is prohibited. When the deterioration determination conditions are again satisfied during this predetermined time interval, the lean burn prohibition continues. In the case that the deterioration determination of the LAF sensor 17 has completed, the lean burn permission is extended for the above-described predetermined time that is shorter than this time (for example, 2 seconds).

According to the present invention described above, in order to attain the above object, the air-fuel ratio control apparatus according to the present invention is characterized in comprising an air-fuel ratio detection device provided in the exhaust system of an internal combustion engine and outputs a signal approximately proportional to the concentration of oxygen in the exhaust, a lean fuel mixture zone determination device that determines whether or not the internal combustion engine is in the lean fuel mixture zone based on the running state of the internal combustion engine, a lean fuel mixture control device that controls the air-fuel ratio of the air-fuel mixture supplied to the internal combustion engine so as to be a leaner air-fuel mixture than the stoichiometric air-fuel ratio when the internal combustion engine is determined to be in the lean fuel mixture zone by the lean fuel mixture zone determination device, a check zone determination device that determines whether or not the internal combustion engine is the check zone, an abnormal check device that checks for a malfunction of the air-fuel ratio detection device based on the output of the air-fuel ratio detection device, and a malfunction check termination device that, during an malfunction check by the malfunction check device, terminates the malfunction check when the check zone determination device determines that the internal combustion engine is not in the check zone and at the same time prohibits this lean fuel mixture control for a predetermined time interval.

In this manner, even in the case that the running conditions of the engine during the monitoring for carrying out a malfunction check of the LAF sensor no longer satisfy the monitor conditions, switching to a lean burn is prohibited for a predetermined time interval, and thus, unlike conventional technology, there is no frequent occurrence of switching from a lean burn to the stoichiometric air-fuel ratio, and the monitor execution frequency by the LAF sensor can be increased, the time for the deterioration determination processing of the LAF sensor can be shortened, and at the same time, drivability can be improved.

What is claimed is:

1. An air-fuel ratio control apparatus comprising:
   an air-fuel ratio detection device, provided in the exhaust system of an internal combustion engine, and outputs a signal approximately proportional to the concentration of oxygen in the exhaust;
   a lean operating determination device for determining whether the operating state of the internal combustion engine is in a predetermined lean fuel mixture region;
   a lean fuel mixture control device for controlling the air-fuel ratio of the air-fuel mixture supplied to the internal combustion engine so as to be a leaner air-fuel ratio than the stoichiometric air-fuel ratio when it is determined by the lean fuel mixture region determination device that the operating state of the internal combustion engine is in the lean fuel mixture region;
   a check operating region determination device for determining whether or not the operating state of the internal combustion engine is in a predetermined region;
   a malfunction check device for checking for a malfunction of the air-fuel ratio detection device based on the output of the air-fuel ratio detection device when the operating state of the internal combustion engine is in the check region; and
   a malfunction check interruption device for interrupting the malfunction check when the check operation region determination device determines during an malfunction check by the malfunction check device that the operating state of the internal combustion engine is not in the check region and for prohibiting at the same time the lean fuel mixture control for a predetermined period of time.

2. An air-fuel ratio control apparatus according to claim 1, wherein the air-fuel control device further comprises:
   a three-way catalyst disposed downstream of said air fuel ratio detection device;
   an oxygen sensor disposed downstream of said three-way catalyst for outputting a lean or rich signal in response to the oxygen concentration of the exhaust gas;
   wherein, said malfunction check device detects the malfunction of the air-fuel ratio detection device when the output of said oxygen sensor changes between the lean and the rich signals.

3. An air-fuel ratio control apparatus according to claim 2, wherein said malfunction of the air-fuel ratio detection device is detected by detecting a plurality of outputs of said malfunction check device and by using an average value of said plurality of outputs.

4. An air-fuel ratio control apparatus according to claim 1, wherein, when it is determined by said check operating region determination device that the operating state of the internal combustion engine is not in the predetermined region, and if said checking operation by said malfunction check device is completed, said malfunction check interruption device does not execute a prohibition operation of the lean fuel mixture control.

5. An air-fuel ratio control apparatus according to claim 1, wherein said check operating region determination device further determines whether or not the driving condition of the vehicle in which said internal combustion engine is installed is under predetermined check conditions.

6. An air-fuel ratio control method comprising the steps of:

detecting an air-fuel ratio by use of an air-fuel ratio detection device, provided in the exhaust system of an internal combustion engine for outputting a signal approximately proportional to the concentration of oxygen in the exhaust;

determining whether the operating state of the internal combustion engine is in a predetermined lean fuel mixture region by use of a lean operating zone determination device;

controlling the air-fuel ratio of the air-fuel mixture supplied to the internal combustion engine so as to be a leaner air-fuel ratio than the stoichiometric air-fuel ratio by use of a lean fuel mixture control device when the operating state of the internal combustion engine is determined to be in the lean fuel mixture region by said lean fuel mixture region determination device,     determining whether the operating state of the internal combustion engine is in a predetermined region by use of a check operating region determination device;

checking a malfunction of the air-fuel ratio detection device by use of a malfunction check device based on the output of the air-fuel ratio detection device when the operating state of the internal combustion engine is in the check region; and     interrupting a malfunction check during the malfunction check by said malfunction check device by use of a malfunction check interruption device when it is determined by the check operation region determination device that the operating state of the internal combustion engine is not in the check region and at the same time prohibiting the lean fuel mixture control for a predetermined period of time.

7. A computer readable recording medium including a program for an air-fuel ratio control method which comprises the steps of:

detecting an air-fuel ratio by use of an air-fuel ratio detection device, provided in the exhaust system of an internal combustion engine for outputting a signal approximately proportional to the concentration of oxygen in the exhaust;

determining whether the operating state of the internal combustion engine is in a predetermined lean fuel mixture region by use of a lean operating zone determination device;

controlling the air-fuel ratio of the air-fuel mixture supplied to the internal combustion engine so as to be a leaner air-fuel ratio than the stoichiometric air-fuel ratio by use of a lean fuel mixture control device when the operating state of the internal combustion engine is determined to be in the lean fuel mixture region by said lean fuel mixture region determination device,     determining whether the operating state of the internal combustion engine is in a predetermined region by use of a check operating region determination device;

checking a malfunction of the air-fuel ratio detection device by use of a malfunction check device based on the output of the air-fuel ratio detection device when the operating state of the internal combustion engine is in the check region; and     interrupting a malfunction check during the malfunction check by said malfunction check device by use of a malfunction check interruption device when it is determined by the check operation region determination device that the operating state of the internal combustion engine is not in the check region and prohibiting at the same time the lean fuel mixture control for a predetermined period of time.

\* \* \* \* \*